(12) United States Patent
Choi

(10) Patent No.: US 9,182,900 B2
(45) Date of Patent: Nov. 10, 2015

(54) USER TERMINAL APPARATUS AND CONTROL METHOD THEREOF

(71) Applicant: SAMSUNG ELECTRONICS CO., LTD., Suwon-si (KR)

(72) Inventor: Sun Choi, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 312 days.

(21) Appl. No.: 13/646,284

(22) Filed: Oct. 5, 2012

(65) Prior Publication Data

US 2014/0033127 A1  Jan. 30, 2014

(30) Foreign Application Priority Data

Jul. 25, 2012  (KR) .................. 10-2012-0080998

(51) Int. Cl.
  G06F 3/048 (2013.01)
  G06F 3/0488 (2013.01)

(52) U.S. Cl.
  CPC .............. *G06F 3/0488* (2013.01); *G06F 3/048* (2013.01)

(58) Field of Classification Search
  CPC ....................................................... G06F 3/048
  USPC ......................................................... 715/825
  See application file for complete search history.

(56) References Cited

U.S. PATENT DOCUMENTS

| | | | |
|---|---|---|---|
| 7,036,091 B1 * | 4/2006 | Nguyen | 715/834 |
| 7,834,861 B2 | 11/2010 | Lee | |
| 8,120,590 B2 | 2/2012 | Lee | |
| 8,279,192 B2 | 10/2012 | Lee | |
| 8,477,112 B2 | 7/2013 | Lee | |
| 2004/0212617 A1 * | 10/2004 | Fitzmaurice et al. | 345/440 |
| 2007/0198949 A1 * | 8/2007 | Rummel | 715/810 |
| 2008/0074399 A1 | 3/2008 | Lee | |
| 2010/0056220 A1 | 3/2010 | Oh et al. | |
| 2010/0070910 A1 | 3/2010 | Zimmerman et al. | |
| 2010/0103117 A1 | 4/2010 | Townsend et al. | |
| 2010/0299638 A1 * | 11/2010 | Choi | 715/835 |
| 2011/0025632 A1 | 2/2011 | Lee | |
| 2012/0113036 A1 | 5/2012 | Lee | |
| 2012/0324386 A1 | 12/2012 | Lee | |
| 2012/0324389 A1 * | 12/2012 | Meng | 715/771 |
| 2013/0201215 A1 * | 8/2013 | Martellaro et al. | 345/633 |

FOREIGN PATENT DOCUMENTS

| KR | 10-0774927 B1 | 11/2007 |
|---|---|---|
| KR | 10-2010-0127081 | 12/2010 |

OTHER PUBLICATIONS

Search Report, dated Nov. 25, 2013, issued by the International Searching Authority, in counterpart Application No. PCT/KR2013/006661.
Written Opinion, dated Nov. 25, 2013, issued by the International Searching Authority, in counterpart Application No. PCT/KR2013/006661.

\* cited by examiner

*Primary Examiner* — Andrea Leggett
(74) *Attorney, Agent, or Firm* — Sughrue Mion, PLLC

(57) ABSTRACT

A control method of a user terminal apparatus. The control method includes receiving a first user input for selecting at least one graphical object from among a plurality of graphic objects displayed on a touch display screen of the user terminal apparatus, altering and displaying at least one graphic element which configures the selected graphical object selected, displaying a menu related to the selected graphical object near the displayed graphical object, and receiving a second user input for selecting the displayed menu, using the touch display screen.

30 Claims, 13 Drawing Sheets

FIG. 9
(a)
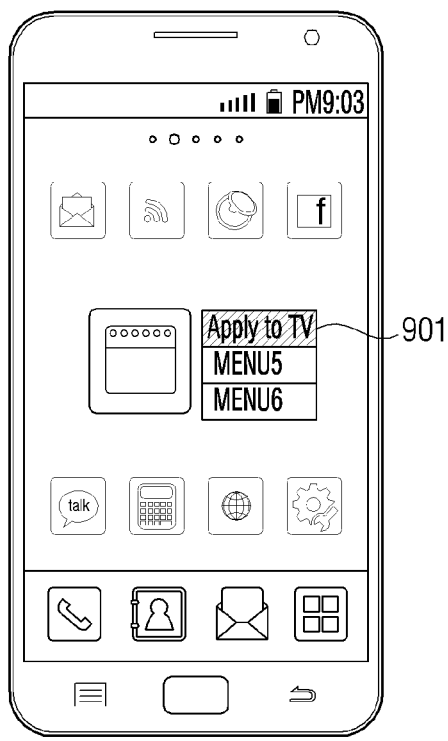
(b)
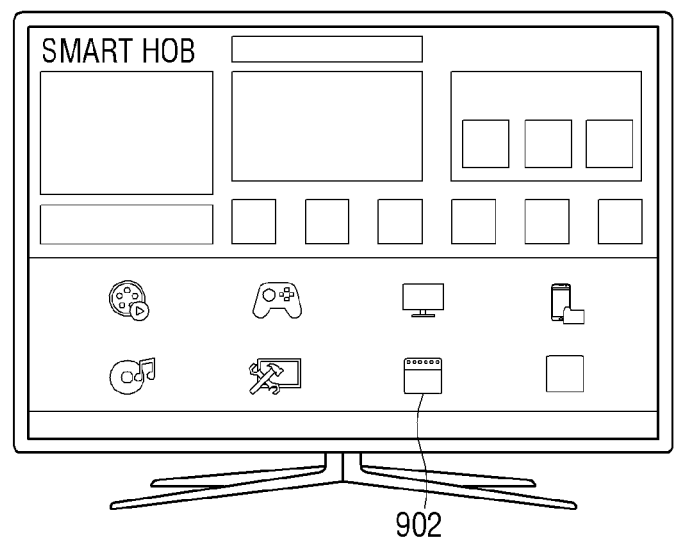

USER TERMINAL APPARATUS AND CONTROL METHOD THEREOF

CROSS-REFERENCE TO RELATED APPLICATIONS

This application claims priority from Korean Patent Application No. 10-2012-0080998, filed in the Korean Intellectual Property Office on Jul. 25, 2012, the disclosure of which is incorporated herein by reference in its entirety.

BACKGROUND

1. Field

Methods and apparatuses consistent with exemplary embodiments broadly relate to a user terminal apparatus and a control method thereof, and more particularly, to a user terminal apparatus which performs various functions using a rotation Graphical User Interface (GUI), and a control method thereof.

2. Description of the Related Art

With the development of electronic technology, various kinds of electronic devices are being developed and provided to users. Especially, user terminal apparatuses such as high-tech smart phones are becoming widespread.

Due to recent price decrease and performance improvement of the high-tech user terminal apparatuses, demand for these high-tech user terminal apparatuses is increasing. Accordingly, efforts are being made to develop more varied and convenient use methods which are suitable for high-tech user terminal apparatuses.

Thus, recently, there is a growing need for various GUIs which could improve a convenience with which the user terminal apparatuses are used.

SUMMARY

An aspect of the exemplary embodiments relates to a user terminal apparatus which is more convenient to use due to various functions being performed using a rotation GUI, and a control method thereof.

Another aspect of the exemplary embodiments relates to a user terminal apparatus which is more convenient to use due to operations of an external device being controlled according to whether or not an application installed in the user terminal apparatus is installed in the external device which is interlocked with the user terminal apparatus, and a control method thereof.

According to an exemplary embodiment, a method of controlling a user terminal apparatus may include receiving a first user input for selecting at least one graphical object of among a plurality of graphical objects; altering and displaying at least one graphic element which configures the selected graphical object; displaying a menu related to the selected graphical object; and receiving a second user input for selecting the displayed menu.

In addition, the menu related to the selected graphical object may include at least one of a function menu regarding a particular function provided by the selected graphical object, and a setting menu for setting an option for the selected graphical object.

Furthermore, the altering and displaying at least one graphical element of the graphical object may include altering and displaying at least one of a size of the graphical object, a location of the graphical object, and a color of the graphical object.

In addition, the control method may further include displaying a Graphical User Interface (GUI) which indicates a rotatable direction near the selected graphical object, when the graphical object is selected.

Furthermore, the control method may further include setting the altered and displayed graphical object in a rotatable state.

In addition, the second user input may be a rotation input for rotating the displayed graphical object in a first direction or a second direction, and the displayed menu may be selected based on the rotation input.

Furthermore, the displayed menu may be selected according to a direction indicated by a top end or low end vertex of the displayed graphical object rotated based on the rotation input.

In addition, the second user input may be a touch input which touches the displayed menu, and the displayed menu may be selected based on the touch input.

Furthermore, the second user input may be a touch input of the GUI corresponding to a rotation direction of the displayed graphical object, and wherein the displayed menu may be selected according to the touch input.

In addition, the control method may further include receiving a third user input for returning back to a state before the at least one graphical object was selected from among a plurality of graphical objects.

Furthermore, the control method may further include providing a feedback which notifies that the selected menu has been altered according to a rotation of the displayed graphical object.

In addition, the control method may further include selecting a menu for an application corresponding to a displayed graphical object, where the application is executable by the external device which is interlocked with the user terminal apparatus according to the second user input; and if the application is pre-installed in the external device, executing the pre-installed application, and if the application is not installed in the external device, controlling the external device to automatically install the application.

According to an exemplary embodiment, a user terminal apparatus may include a touch display screen which receives a user input and displays a plurality of graphical objects; and a controller which alters and displays at least one graphical element configuring the graphical object selected based on the first user input and controls the touch display screen to display a menu related to the selected graphical object, and controls to select the displayed menu based on the user input.

In addition, the menu related to the selected graphical object may include at least one of a function menu regarding a particular function provided by the selected graphical object, and a setting menu for setting an option of the selected graphical object.

Furthermore, the controller may alter and display at least one of a size of the graphical object, a location of the graphical object, and a color of the graphical object corresponding to the graphical element.

In addition, the controller may control the display screen to display a Graphical User Interface (GUI) which indicates a rotatable direction near the selected graphical object, when the graphical object is selected.

Furthermore, the controller may set the altered and displayed graphical object in a rotatable state.

In addition, the second user input may be a rotation input for rotating the displayed graphical object in a first direction or a second direction, and the displayed menu may be selected based on the rotation input.

Furthermore, the displayed menu may be selected according to a direction indicated by a top end or low end vertex of the displayed graphical object rotated based on the rotation input.

In addition, the second user input may be a touch input with respect to the displayed menu, and the displayed menu may be selected according to the touch input.

Furthermore, the displayed menu may be selected according to the touch input, if the user input includes a second user input which is a touch input of an arrow GUI corresponding to a rotation direction of the displayed graphical object.

In addition, the controller may control the display screen to return to a state before the at least one graphical object was selected from among a plurality of graphical objects, if a third user input is received using the display screen, which is a touch display screen.

Furthermore, the controller may provide feedback which notifies that the selected menu has been altered according to a rotation of the selected graphical object.

In addition, the user terminal apparatus may further include a communication interface which connects the user terminal apparatus with an external device, and if a menu for an application corresponding to a displayed graphical object where the application is executable by an external device which is interlocked with the user terminal apparatus, is selected according to the user input and if the application is pre-installed in the external device, the controller may execute the pre-installed application, if the menu for the application corresponding to the displayed graphical object where the application is executable by the external device which is interlocked with the user terminal apparatus, is selected according to the user input and if the application is not pre-installed in the external apparatus, the controller may send a control signal for automatically installing the application using the communication interface.

Meanwhile, according to an exemplary embodiment, in a non-transitory computer readable recording medium where a program code for executing a method of controlling a user terminal apparatus is recorded thereon, the control method may include receiving a first user input for selecting at least one graphical object from among a plurality of graphical objects; altering and displaying at least one graphical element which configures the selected graphical object; displaying a menu related to the selected graphical object; and receiving a second user input for selecting the displayed menu.

BRIEF DESCRIPTION OF THE DRAWINGS

The above and/or other aspects will be more apparent by describing certain exemplary embodiments with reference to the accompanying drawings, in which:

FIG. 9 is a view illustrating controlling operations of an external device, according to whether or not an application installed in a user terminal apparatus is installed in the external device is interlocked to the user terminal apparatus according to an exemplary embodiment;

DETAILED DESCRIPTION

Figure 1:
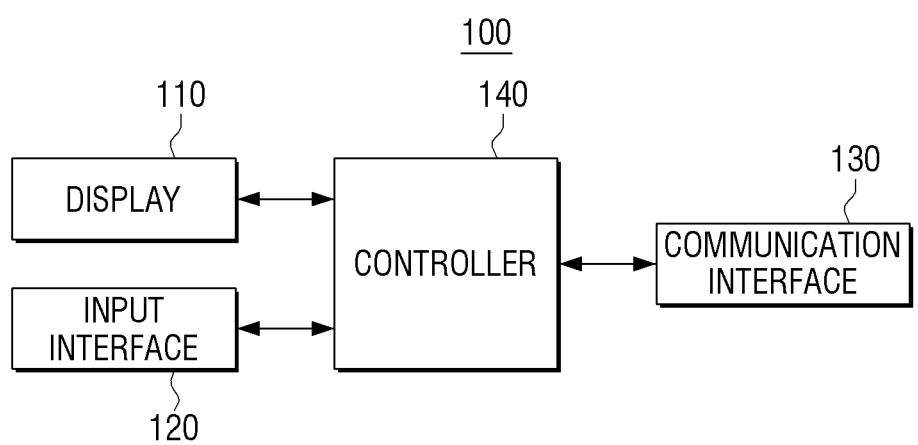
FIG. 1 is a block diagram illustrating a user terminal apparatus according to an exemplary embodiment.

Certain exemplary embodiments are described in higher detail below with reference to the accompanying drawings.

In the following description, same drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure exemplary embodiments with unnecessary details.

FIG. 1 is a block diagram illustrating a user terminal apparatus according to an exemplary embodiment. With reference to FIG. 1, the user terminal apparatus 100 includes a display 110, an input interface 120, a communication interface 130, and a portion or an entirety of a controller 140.

Herein, the user terminal apparatus 100 may be embodied as one of various apparatuses such as a mobile phone, smart phone, tablet computer, notebook computer, PDA (Personal Digital Assistants), PMP (Portable Multimedia Player), navigation, and digital TV etc. An exemplary terminal apparatus includes a memory, a processor, and a display screen.

The display 110 displays a screen. Especially, in an exemplary embodiment, the display 110 may display a screen which includes a plurality of graphical objects. A graphical object may be any graphical object which a user selects such as an application icon, a folder which includes at least one application icon, a thumb nail image of a sound source file, an image such as a thumb nail image of a video file, and text or GUI, and etc.

In an exemplary embodiment, the display 110 may be embodied as at least one of a liquid crystal display, a thin film transistor-liquid crystal display, an organic light-emitting diode, a flexible display, a 3D display, and a transparent display.

The input interface 120 receives a user input regarding the user terminal apparatus 100.

In an exemplary embodiment, the input interface 120 may be embodied as a touch sensor. A touch sensor may be embodied as a capacitive touch sensor or a resistive touch sensor. A capacitive touch sensor uses dielectric substance coated on a surface of the display 110 to sense micro electricity excited as the user's body part touches the surface of the display 110 to calculate the coordinates where the display is being touched. A resistive touch sensor has two electrodes, and when a user touches the screen, as an upper and lower electrode of the touched point touch each other, current flows, and thus the resistive touch sensor is able to sense the current and calculate the coordinates of where the display is being touched. As such, a touch sensor may be embodied in various forms. Accordingly, when the input interface 120 receives a user's touch input, it sends an electric signal corresponding to the touched point to the controller 140, and then the controller 140 uses the coordinates delivered by the electric signal to perceive the touched point. Meanwhile, in explaining an exemplary embodiment in FIG. 1, the display 110 and input interface 120 are described as being formed separately, but in a case where the input interface 120 is embodied as a touch sensor, the display 110 and input interface 120 may be combined and embodied as a touch display screen.

In addition, in an exemplary embodiment, the input interface 120 may be embodied as a proximity sensor. A proximity sensor is a sensor for sensing a motion which does not directly touch the surface of the display 110 but approaches the surface of the display 110. A proximity sensor may be embodied as a high-frequency oscillation-type proximity sensor which forms a high-frequency magnetic field and senses current induced by characteristics of the magnetic field which change when an object approaches, a magnetic type proximity sensor which uses a magnet, and a capacitance-type proximity sensor which senses changed capacitance volume due to an approach by an object. Accordingly, when the input interface 120 receives a user input according to an approaching motion, the input interface 120 sends an electric signal corresponding to the user input to the controller 140, and the controller 140 may use the delivered electric signal to perceive the user input according to the approached motion.

In addition, in an exemplary embodiment, the input interface 120 may be embodied as a microphone. The microphone receives a voice that the user uttered. A voice input perception unit (not shown) converts the input voice signal into an electric signal and sends the electric signal to the controller 140. In this case, the controller 140 uses the delivered electric signal to perceive the user input according to the voice input.

More specifically, the controller 140 may detect a start and end of the voice that the user uttered in the input voice signal, and determine a voice section of the input voice signal. The controller 140 may calculate energy of the input voice signal, classify an energy level of the voice signal according to the calculated energy, and detect the voice section through a dynamic programming. The controller 140 may detect a phoneme which is the smallest unit of voice based on an acoustic model in the voice signal in the detected voice section and generate phoneme data. The controller 140 may apply an HMM (Hidden Markov Model) to the generated phoneme data and generate text information. Accordingly, the controller 140 uses the delivered electric signal to perceive the user input according to the voice input.

In addition, in an exemplary embodiment, the input interface 120 may be embodied as a motion sensor. Herein, the motion sensor may be embodied to include at least one of an acceleration sensor, a terrestrial magnetism sensor, and a gyro sensor. Accordingly, when a user input of rotating or tilting the user terminal apparatus 100 in 3 coordinate axial direction is received, the input interface 120 sends an electric signal corresponding to the user manipulation to the control unit 140, and the control unit 140 uses the delivered electric signal to perceive the user input according to the proximity motion.

In addition, in an exemplary embodiment, the input interface 120 may be embodied as a pressure sensor. Herein, a pressure sensor may include a piezo film which outputs electric signals corresponding to an amount of pressure exerted. Accordingly, when a user's touch input is received, the input interface 120 senses an amount of pressure exerted on a touched point and sends an electric signal corresponding to the amount of the pressure to the controller 140, and the controller 140 uses the electric signal to perceive the amount of the exerted pressure.

In a case the touch sensor is embodied as a resistance type touch sensor, the resistance type touch sensor may also play a role of a pressure sensor.

Furthermore, in an exemplary embodiment, the input interface 120 may be embodied as a combination of an input device such as a mouse, keyboard, remote control etc. with a display apparatus such as a display 110. In this case, the controller 140 may use the user input received using the input device to perform a function corresponding thereto.

In addition, the input interface 120 may also receive user input according to a movement of a user's pupil or user input according to a user's brainwave.

In an exemplary embodiment, the input interface 120 may be configured to include at least one of the aforementioned configurations which receive user input.

In an exemplary embodiment, the communication interface 130 connects the user terminal apparatus 100 to an external device. Especially, when a menu for executing an application, which corresponds to a displayed graphical object, and which interlocks an external device with the user terminal apparatus 100, is selected through the input interface 110, the communication interface 130 may transmit a control signal for controlling the external device to the external device.

In an exemplary embodiment, the external device may be embodied as one of various apparatuses such as a digital TV, a notebook computer, a tablet computer, a desktop computer, a mobile phone, a smart phone etc. which are interlocked with the user terminal apparatus 100.

In an exemplary embodiment, the communication interface 130 is configured to connect the user terminal apparatus 100 to the external device, and may have a format of accessing using wired communication or wirelessly through a Local Area Network (LAN) or internet, accessing through a Universal Serial Bus (USB) port, accessing through a mobile communication network such as 3G and 4G, or accessing through a short distance wireless communication method such as Blue Tooth, NFC (Near Field Communication), RFID (Radio Frequency Identification), and Zigbee etc.

In an exemplary embodiment, the controller 140 controls the overall operations of the user terminal apparatus 100. More specifically, the controller 140 may control a portion of or an entirety of the display 110, the input interface 120, and the communication interface 130.

Especially, when a first user input for selecting at least one graphical object from among a plurality of displayed graphical objects is received through the input interface 120, the controller 140 may control the display 110 to alter and display at least one graphical element of the graphical object selected according to the first user input.

In an exemplary embodiment, the first user input may be a touch and hold input in which the user is touching and holding the graphical object to be selected.

In addition, in an exemplary embodiment, the first user input may be the user's voice input of uttering a name corresponding to the graphical object to be selected. For example, in a case where the name of an application corresponding to the graphical object to be selected is a "telephone", the voice input may be a "telephone rapid execution" voice input that the user uttered.

Furthermore, in an exemplary embodiment, the first user input may be an input of multi touching the graphical object to be selected with two fingers and then spreading the two fingers to each side.

In addition, in an exemplary embodiment, the first user input may be a motion input of tilting or rotating the user terminal apparatus 100 in a certain direction while touching the graphical object to be selected.

Furthermore, in an exemplary embodiment, the first user input may be an input of touching the graphical object to be selected with or above a predetermined pressure amount.

However, the first user input is not limited to the aforementioned, but it may be performed in various methods such as an input according to the user's proximity motion, input according to a movement of a pupil, input through an input device, etc. according to an exemplary embodiment of the input interface 120 included in the user terminal apparatus 100.

When the aforementioned first user input is received through the input interface 120, the controller 140 may control the display 110 to alter and display at least one graphical element of the graphical object selected according to the first user input.

In an exemplary embodiment, the altering and displaying at least one graphical element of the selected graphical object may be altering and displaying at least one of a size, a location, and a color of the graphical object.

Altering the size of the selected graphical object may be an operation where the size of the selected graphical object becomes bigger or smaller.

Altering the location of the selected graphical object may be an operation of moving the selected graphical object to a predetermined location on the displayed screen regardless of the original location of the selected graphical object.

Altering the color of the selected graphic object may be an operation of altering the original color of the selected graphical object to a different color.

Meanwhile, it is also possible to alter at least one of the size, the location, and the color of the selected graphical object in such a manner that the selected graphical object is displayed to shake at the currently displayed location, or to apply a 3D effect so that the selected graphical object is displayed as appearing to protrude in the front direction of the display 110 or as appearing to cave in in the rear direction of the display 110.

In addition, in an exemplary embodiment, the controller 140 may control the display 110 to display a menu related to the graphical object near the altered, displayed graphical object.

In an exemplary embodiment, a menu related to the selected graphical object may be provided in a text or an icon format.

In an exemplary embodiment, the menu related to the selected graphical object may include at least one of a function menu regarding a particular function provided in the graphical object and a setting menu for setting an option of the selected graphical object.

In a case where the selected graphical object corresponds to a map application, the function menu may include a map search menu, a road search menu, a surroundings search menu, and a menu which is interlocked with the external device etc. In such a case, the menu interlocked with an external device may include a location sharing menu and a routing information sharing menu, etc.

In a case where the selected graphical object corresponds to a music application, the function menu may include a favorite list menu, an artist menu, an album menu, and a menu interlocked with an external device. In this case, the menu interlocked with an external device may include a music sharing menu using mails or a Social Network Service (SNS), Short Message Service (SMS) etc., and Allshare menu etc.

In a case where the selected graphical object corresponds to a game application, the function menu may include a Setup menu, a 1 player/2 players setting menu, a new game menu, and a menu interlocked with an external device etc. In such a case, the menu interlocked with an external device may include a menu for setting a subject of the game.

Furthermore, in an exemplary embodiment, the setting menu may include a delete menu, a graphical object shifting menu, an install menu, an update menu, a communication methods selecting menu, and an interlocked service selecting menu etc. The communication methods selecting menu may include Wi-fi, BT, 3G, and 4G etc. as its sub menu. The interlocked service selecting menu may include a Social Network Service (SNS), mail, and cloud etc. as its sub menu.

As aforementioned, the user terminal apparatus 100 according to an exemplary embodiment may easily select a menu by displaying a menu related to a selected graphical object, when a first user input is received. Especially, by displaying a function menu related to the selected graphical object, it may immediately execute certain functions provided by the application corresponding to the selected graphical object.

Meanwhile, displaying the function menu or the setting menu may differ according to a rotation state of an inclination state of the user terminal apparatus 100. That is, in a case where the user terminal apparatus 100 is rotated or tilted to a horizontal mode, the function menu and setting menu may be displayed in the horizontal mode so that the user can easily see it. Likewise, in a case where the user terminal apparatus 100 is rotated or tilted to a vertical mode, the function menu and setting menu may also be displayed in the vertical mode so that the user can easily see it.

In addition, the function menu and the setting menu may be placed in a certain area of the display 110 so that they do not overlap each other. For example, the function menu may be placed on an upper, lower, left or right side of the selected graphical object, while the setting menu is placed on a lower, upper, right, or left side of the selected graphical object, respectively. However, the location of the function menu and the setting menu is not limited thereto, but may be altered according to a state of setting of the user terminal apparatus 100.

In addition, the location where the function menu and the setting menu are placed on the display 110 may be altered according to characteristics of the selected graphical object. For example, the location of displaying the function menu and the setting menu may be altered according to whether the graphical object is an application or an image. In an exemplary embodiment, the location where the function menu and the setting menu are placed on the display 110 may be altered according to the type of the selected graphical object.

Meanwhile, when a graphical object is selected according to a first user input, the controller 140 may control the display 110 to display a GUI which indicates a rotation direction near the selected graphical object.

Herein, the GUI which indicates the rotation direction of the selected graphical object may include an arrow GUI which indicates a first direction, and an arrow GUI which indicates a second direction. In addition, the arrow GUI may be displayed on a certain area surrounding the selected graphical object. Herein, the first and second direction may be rotation directions of the selected graphical object such as left, right, upper, and lower side etc.

As aforementioned, the user terminal apparatus 100 according to an exemplary embodiment may easily perceive that a graphical object has been selected by altering and displaying at least one graphical element of the graphical object selected based on the first user input.

Meanwhile, altering and displaying at least one graphical element of the selected graphical object is an option, and thus depending on a setting of the user terminal apparatus 100, a display may not be altered. Furthermore, altering and displaying at least one graphical element of the selected graphical object may be done at the same time of displaying the menu related to the graphical object, before displaying the menu related to the graphical object, or after displaying the menu related to the graphical object.

Meanwhile, the controller 140 may set a graphical object selected according to a first user input in a rotatable state.

More specifically, when a first user input is received in a first area inside the graphical object, the controller 140 may set the graphical object in a rotatable state either after altering and displaying at least one graphical element of the graphical object selected according to the first user input or without any altering of the display. Herein, the first area may desirably be a vertex area of the graphical object. Accordingly, the user may perform thereafter a second user input for rotating the selected graphical object by rotating an upper end or a lower end vertex of the selected graphical object in a rotation direction without altering the location of the first user input. In this case, altering at least one graphical element of the selected graphic object may include at least one of altering a size or altering a color. If it is a case of altering the size of the selected graphical object, the altering of the size may be one made at a state where the vertex of the selected graphical object is fixated in the first user input location.

Otherwise, when a first user input is received in a second area inside the graphical object, the controller 140 may alter and display at least one graphical element of the graphical object selected according to the first user input, and then set the selected graphical object in a rotatable state. Herein, the second area may desirably be an area other than the vertex of the selected graphical object. In this case, altering at least one graphical element of the selected graphical object may include at least one of altering a location, altering a size, or altering a color.

That is, when the first user input is received in the second area inside the graphical object, the selected graphical object may be set in a rotatable state after the vertex of the selected graphical object is shifted to the second area. For example, when the user touches a central portion of a particular graphical object, the controller 140 may control the display so that the vertex of the graphical object shifts to the touch area of the user input, in which case, if the vertex of the graphical object is located in the touch area of the user input, the graphical object may be set in a rotatable state.

Otherwise, when the first user input is received in the second area inside the graphical object, the selected graphical object may be set in a rotatable state after shifting the selected graphical object to a predetermined location and then expanding it.

Meanwhile, setting the selected graphical object in a rotatable state is an option, and thus depending on the state of a setting of the user terminal apparatus 100, the selected graphical object may not be set in a rotatable state. Furthermore, setting in a rotatable state may be conducted either after at least one graphical element of the selected graphical object is altered and displayed, or without altering of the display.

In addition, when a second user input for selecting a displayed menu is received from the input interface 120, the controller 140 may select a displayed menu.

Herein, the second user input may be a rotation input for rotating the selected graphical object for selecting a displayed menu in a first or a second direction. In this case, the rotation input of the selected object may be an input of dragging the upper end or lower end vertex of the selected graphical object in a rotating direction, or an input of releasing and then dragging. Herein, the dragging input may be an input of dragging the upper end or lower end vertex of the graphical object selected by a touch input in a case where the first user input is a touch input in a rotating direction. In addition, the releasing and then dragging input may be an input of removing a touch input and then dragging the upper end or lower end vertex of the selected graphical object in a rotating direction in a case where the first user input is a touch input.

Accordingly, when a rotation input is received through the input interface 120, the controller 140 may select a displayed menu according to the rotation input.

Hereinbelow, for convenience of explanation and by way of an example only, the first direction may be a left direction, the second direction may be a right direction, a first menu is a menu placed in to the left of the selected graphical object, and a second menu is a menu placed to the right of the selected graphical object. Herein, the first menu may be a function menu or a setting menu, and the second menu may be a setting menu or a function menu, respectively. In addition, the first and second menus may include a plurality of menus.

More specifically, in a state where the first and second menus are displayed, when the user rotates the upper end vertex of the selected graphical object in the left direction, an uppermost menu in the first menu may be selected. Next, when the user rotates the upper end vertex of the selected graphical object in the left direction, a menu beneath the uppermost menu in the first menu may be selected. Next, when the user rotates the upper end vertex of the selected graphic object in the right direction, the uppermost menu in the first menu may be selected.

In a state where the first and second menus are displayed, when the user rotates the upper end vertex of the selected graphic object in the right direction, the uppermost menu in the second menu may be selected. Next, when the user rotates the upper end vertex of the selected graphical object in the right direction, a menu beneath the uppermost menu in the second menu may be selected. Next, when the user rotates the upper end vertex of the selected graphical object in the left direction, the uppermost menu in the second menu may be selected.

In a state where the first and second menus are displayed, when the user rotates the lower end vertex of the selected graphical object in the right direction, the uppermost menu in the first menu may be selected. Next, when the user rotates the lower end vertex of the selected graphical object in the right direction, a menu beneath the uppermost menu in the first menu may be selected. Next, when the user rotates the lower end vertex of the selected application graphical object in the left direction, the uppermost menu in the first menu may be selected.

In a state where the first and second menus are displayed, when the user rotates the lower end vertex of the selected application graphical object in the left direction, the uppermost menu in the second menu may be selected. Next, when the user rotates the lower end vertex of the selected graphical object in the left direction, a menu beneath the uppermost menu in the second menu may be selected. Next, when the user rotates the lower end vertex of the selected graphical object in the right direction, the uppermost menu in the second menu may be selected.

Herein, the upper end vertex may be a left or right upper end vertex, while the lower end vertex may be a left or right lower end vertex. In addition, the rotated graphic object may be recovered to a pre-rotated state when a certain menu is selected. Moreover, the above description is provided by way of an example only. For example, the user may first use the upper end vertex and then use the lower end vertex or vice versa.

In other words, as aforementioned, a selected menu may be selected based on a rotation direction of the upper end or lower end vertex. However, the selecting is not limited thereto, but depending on a setting of the user terminal apparatus 100, the rotation of the lower end vertex may be set to be selected starting from the lowermost menu of the first or second menus according to its rotation direction.

In addition, as aforementioned, a displayed menu may be selected discontinuously, and depending on a setting of the user terminal apparatus 100, the displayed menu may also be selected continuously. For example, in a case where the user maintains a state of rotating at or above a predetermined rotation degree of the left upper end of the selected graphical object, a menu may be selected continuously starting from the uppermost menu to the lowermost menu in the first menu as a highlight of the selected menu moves. In addition, in a case where the user maintains a state of rotating at or above a predetermined rotation degree of the right upper end of the graphical object, a menu may be selected continuously starting from the uppermost menu to the lowermost menu in the second menu as a highlight of the selected menu moves.

In addition, according to the aforementioned, a menu is selected as the upper end or lower end vertex is rotated, but this is not limited thereto, but a menu may also be selected by rotating the selected graphical object according to a touch input of an arrow GUI placed near the selected graphical object. More specifically, the arrow GUI may include a first arrow GUI indicating a rotation in the left direction and a second arrow GUI indicating a rotation in the right direction, in which case, a menu may be selected as an arrow GUI corresponding to the rotation direction of the selected graphical object is selected.

In addition, the first and second menus may be selected according to a direction that the upper end or the lower end vertex rotated in the selected graphical object indicates.

More specifically, in a state where the first and second menus are displayed, when the user rotates the left upper end vertex of the selected graphical object in the left direction, the menu displayed in the direction that the left upper end vertex indicates in the first menu may be selected.

When the user rotates the right upper end vertex of the selected graphical object in the right direction, the menu displayed in the direction that the right upper end vertex indicates in the second menu may be selected.

Herein, the vertex that becomes the basis of selecting a menu may be the vertex that the user selected first. For example, in a case where the user first rotates the left upper end vertex in order to rotate the graphical object, the left upper end vertex may become the vertex of the indicating direction for the basis of selection. However, it is not limited thereto, but the vertex which becomes the basis may change according to setting states.

In addition, according to the aforementioned, a menu is selected as the upper end or the lower end vertex is rotated, but this is not limited thereto, but a menu may also be selected as the selected graphical object is rotated according to a touch input of a GUI placed near the selected graphical object. More specifically, the arrow GUI may include a first arrow GUI which indicates a rotation in the left direction and a second arrow GUI which indicates a rotation in the right direction, and when a touch of the arrow GUI corresponding to the rotation direction of the selected graphical object is maintained, the upper end or lower end vertex of the selected graphical object may maintain the rotation in the left or right direction. In this case, a menu may be selected according to a direction which the upper end or lower end vertex rotated in the selected graphical object indicates.

In addition, a highlight may be displayed in a selected menu. Furthermore, when a rotation input is released in a state where a menu is selected according to the aforementioned rotation input (that is, when a finger's touch state is removed), the selected menu may be executed.

As aforementioned, the user terminal apparatus 100 according to an exemplary embodiment may easily select a menu through a rotation input.

In addition, the second user input may be a touch input which touches a displayed menu for selecting the displayed menu. In this case, the menu selected by a touch menu may be executed at the same time as it is touched or shortly thereafter, by way of an example.

Furthermore, the second user input may be an input through an input device which is interlocked with the user terminal apparatus 100 for selecting a displayed menu. Herein, the input device may be a mouse, keyboard, and remote control etc. In this case, a menu selected through the input device may be executed when a predetermined execution button is selected.

For convenience of explanation and by way of an example, the user terminal apparatus 100 may be a digital TV, and the input device may be a remote control.

Herein, the remote control may be interlocked with the digital TV in various methods such as blue tooth and IR etc. Accordingly, the user may use a direction key on the remote control to select a particular graphical object from among the graphical objects displayed on the digital TV. In addition, the user may move the remote control like a mouse. In this case, the digital TV may display a pointer corresponding to the location of the remote control on the screen. Accordingly, the user may place the pointer displayed on the digital TV on the graphical object to be selected, and input a selection key on the remote control, thereby selecting a graphical object. As aforementioned, when a graphical object is selected, a menu may be displayed near the selected graphical object.

The user may select a particular menu from among the menus displayed using an up, down, left, right direction keys placed on the remote control.

In addition, the user may place a pointer on the menu for selecting from among the menus displayed in order to select the displayed menu, and input the selection key placed on the remote control, thereby selecting a menu.

However, the aforementioned second user input method is not limited thereto, but the second user input may be performed using various methods such as a user input according to proximity motion and user input according to voice input etc. according to exemplary embodiment method of the input interface 120 included in the user terminal apparatus 100.

Meanwhile, according to a setting state of the user terminal apparatus 100, the second user input for selecting a displayed menu may be performed after at least one operation either after at least one graphical element of the selected graphical object is altered and displayed or after the selected graphical object is set in a rotatable state.

In addition, when a third user input is received through the input interface 120, the controller 140 may control the display 110 to return back to the state before at least one graphical object was selected from among a plurality of graphical objects.

Herein, the third user input may be a user input of touching an area other than the screen area where the selected graphical object is displayed.

Furthermore, the third user input may be a voice input of a user who utters a name corresponding to the selected graphical object. For example, in a case where a name of the application corresponding to the graphical object to end the operations thereof (to complete and exit the application) is "telephone", the voice input may be "end telephone" as voice input uttered by the user.

In addition, the third user input may be an input of multi touching the selected graphical object with two fingers and then moving the two fingers closer.

Furthermore, the third user input may be a motion input of either tilting or rotation the user terminal apparatus 100 in a certain direction while touching the selected graphical object.

In addition, the third user input may be an input of touching the selected graphical object with or above a predetermined pressure.

However, the third user input is not limited thereto, but may be performed in various methods such as input according to the user's proximity motion, and input according to a motion of a pupil etc. according to an exemplary embodiment of the input interface 120 included in the user terminal apparatus 100.

In such a case, the controller 140 may control the display 110 to return back to before at least one graphic object was selected from among the plurality of graphic objects. For example, the controller 140 may control the display 110 to return back to a home screen which is a state before at least one graphical object was selected.

However, it is not limited thereto, but depending on a setting state of the user terminal apparatus 100, when the third user input is input, it is possible to return back to a state where a graphical object has been selected, or where at least one graphical element of the selected graphical object has been altered and displayed, or where the selected graphical object has been set to be rotatable.

In addition, the controller 140 may provide feedback which notifies that a menu to be selected has been altered according to a rotation of the selected graphical object.

Herein, the feedback may be provided as a sound. In this case, when the controller 140 rotates the selected graphical object, it may provide sound such as when turning a jog button, and may also provide a certain sound when a menu to be selected is altered according to a rotation of the selected graphical object.

In addition, the feedback may be provided in vibration. In this case, when a menu to be selected is altered according to the selected graphical object, the controller 140 may provide vibration.

Furthermore, the feedback may be provided as a GUI. In this case, the controller 140 may display a highlight on the selected graphical object or display a distinguishable color. In addition, when the menu to be selected is altered according to a rotation of the selected graphical object, the controller 140 may display distinguishable colors on the altered menu.

Accordingly, the user may easily know and/or detect that a menu to be selected has been altered according to a rotation.

In addition, when a menu for applying an application corresponding to the graphical object selected through the input interface 120 to an external device interlocked with the user terminal apparatus 100 is selected, the controller 140 may control the external device. More specifically, when an application corresponding to the graphical object selected in the user terminal apparatus 100 is pre-installed in the external device, the controller 140 may generate a control signal for the external device to execute the pre-installed application. In addition, when an application corresponding to the graphical object selected in the user terminal apparatus is not installed in the external device, the controller 140 may generate a control signal for automatically installing an application. Herein, the generated control signal may be transmitted to the external device through the communication interface 130. In this case, the external device may either execute the pre-installed application according to the delivered control signal or automatically install the application.

According to the control method of the external device according to an exemplary embodiment, it is possible to improve the convenience of manipulating the external device for the user by controlling operations of the external device according to whether or not the application installed in the user terminal apparatus is installed in the external device interlocked with the user terminal apparatus.

Figure 2:
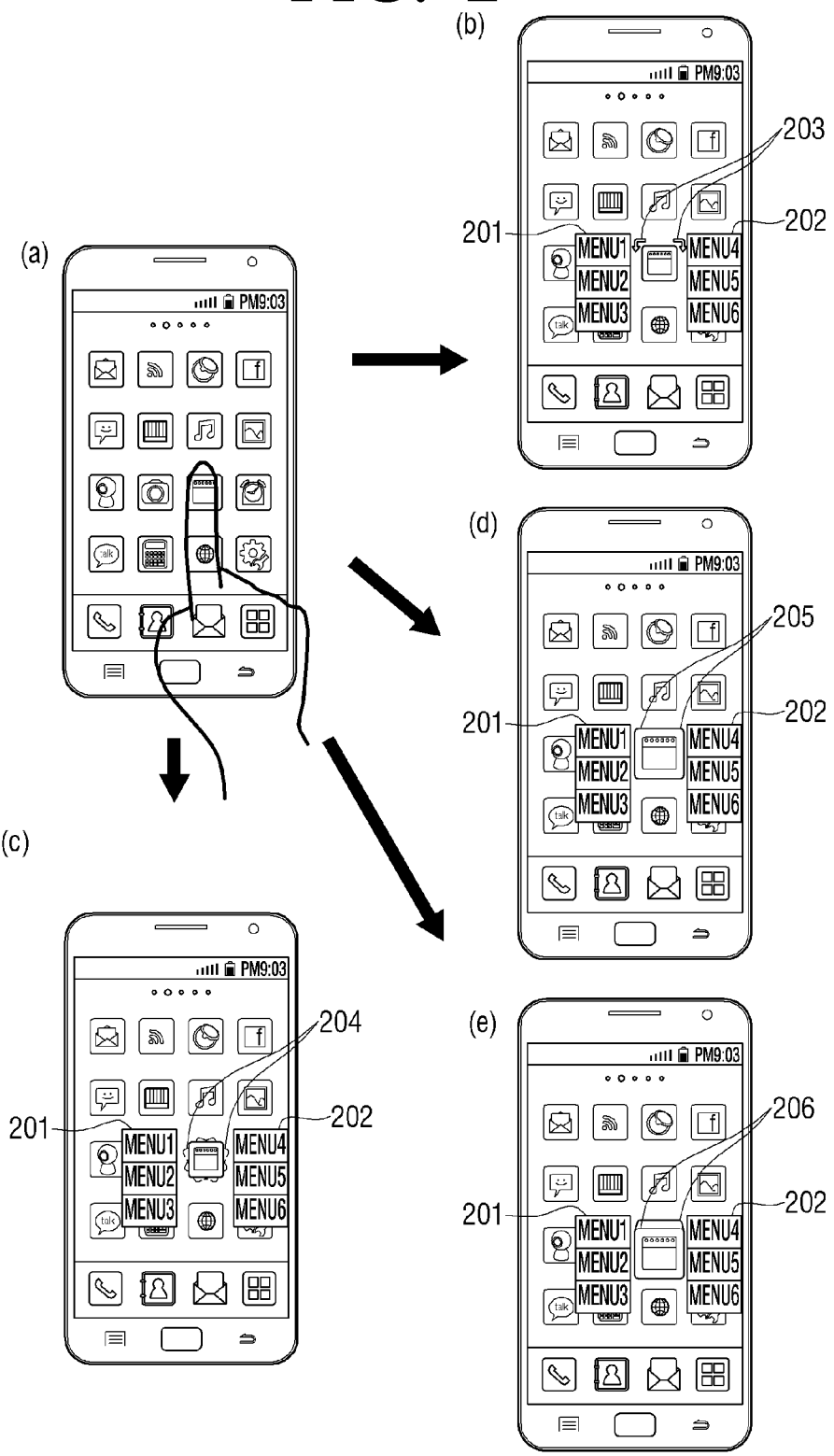
FIG. 2 is a view illustrating a state where at least one graphic element of a selected graphic object has been altered and displayed according to an exemplary embodiment.

FIG. 2 is a view illustrating altering and displaying at least one graphical element of the selected graphical object according to an exemplary embodiment. As shown in FIG. 2, in a view (a) when at least one graphical object is selected based on a first user input in a state where a plurality of graphical objects are displayed, a GUI which indicates a rotatable direction 203 of the selected graphical object may be displayed, as shown in FIG. 2 in a view (b). Otherwise, as shown in FIG. 2 in a view (c), a shaking 204 of the selected graphical object may be displayed. Otherwise, as shown in FIG. 2 in a view (d), a size 205 of the selected graphical object may be increased and then displayed. Otherwise, as shown in FIG. 2 in a view (e), a 3 dimensional effect of the selected graphical object may be altered and then displayed. As shown in FIG. 2, once a graphical object is selected (view a), menus for the selected graphical object are displayed. For example, Menu 1, 2, and 3 201 are displayed on one side of the selected graphical object and Menu 4, 5, and 6 202 are displayed on the other side of the selected graphical object.

Figure 3:
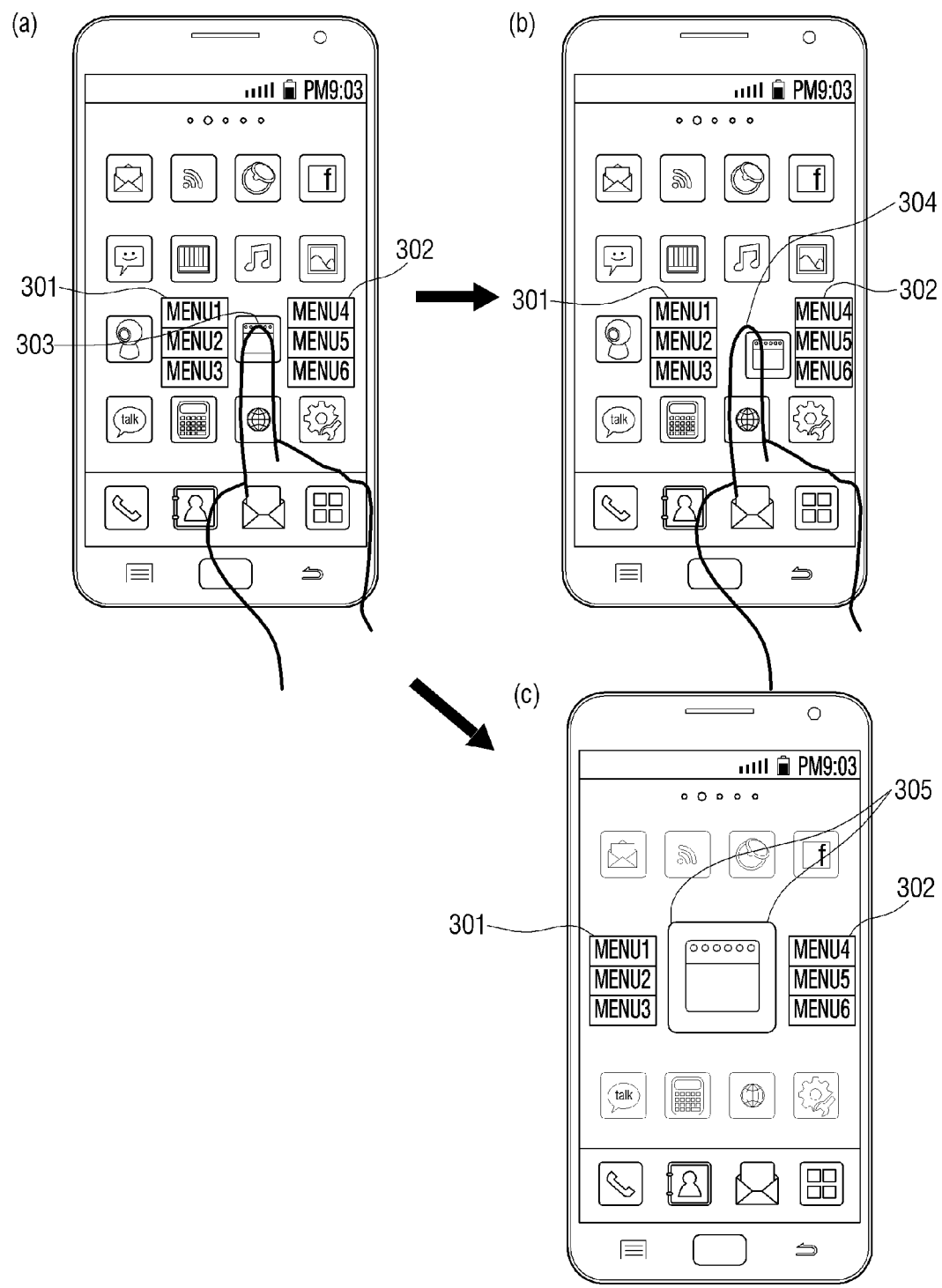
FIG. 3 is a view illustrating setting a selected graphic object in a rotatable state according to an exemplary embodiment.

FIG. 3 is a view illustrating setting the selected graphical object to a rotatable state according to an exemplary embodiment. As in FIG. 3, view (a), when a central area of the selected graphical object is touched 303 in a state where the graphical object is selected, it may move to an area touched by a vertex 304 of the selected graphical object as in FIG. 3, view (b). That is, when the user touches a central portion of a particular graphical object 303, the controller 140 may control the vertex of the graphical object to move to the user's touch area (e.g., upper left vertex 304 as shown in view (b)), in which case, when the vertex of the graphical object is located in the user's touch area, the controller 140 may set the selected graphical object in a rotatable state. Otherwise, the selected graphical object may be moved to a predetermined location on the screen and be enlarged 305, as shown in view (c).

In this case, the selected graphical object may be set in a rotatable state. Accordingly, when the user performs an operation of rotating the selected graphical object, the selected graphical object may rotate in a direction corresponding to the rotation operation. As shown in FIG. 3, menus for the selected graphical object remain displayed. For example, Menu 1, 2, and 3 301 are displayed on one side of the selected graphical object and Menu 4, 5, and 6 302 are displayed on the other side of the selected graphical object.

Figure 4:
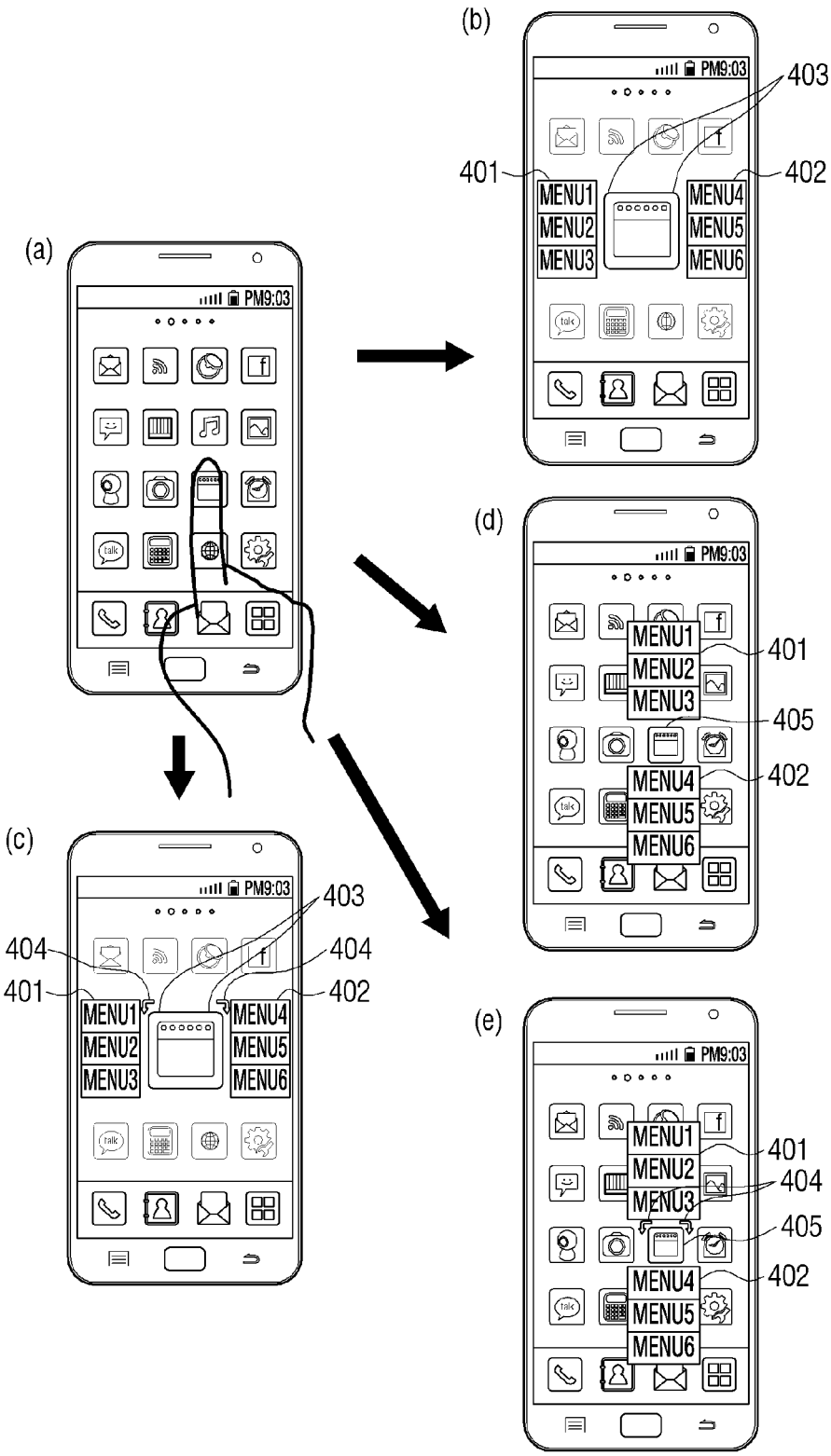
FIG. 4 is a view illustrating displaying a menu related to a selected graphic object according to an exemplary embodiment.

FIG. 4 is a view illustrating displaying a menu related to the selected graphical object according to an exemplary embodiment. As shown in FIG. 4, view (a), when at least one graphical object is selected based on a first user input in a state where a plurality of graphical objects are displayed, the selected graphical object is moved to a central area and is enlarged 403 as shown in FIG. 4, view (b), displaying a first and second menus 401, 402.

Otherwise, as shown in FIG. 4, view (c), as the selected graphical object is moved to the central area and is enlarged 403, and as a rotation GUI 404 which indicates a rotatable direction is displayed in the surrounding area, the first and second menus 401, 402 may be displayed.

Otherwise, as shown in FIG. 4, view (d), the first and second menus 401, 402 may be displayed on an upper end and lower end of the selected graphical object without a particular additional process i.e., without a modification in an appearance of the displayed graphical object 405.

Otherwise, as shown in FIG. 4, view (e), as the rotation GUI 404 which indicates a rotatable direction is displayed near the selected graphical object 405, the first and second menus 401, 402 may be displayed on the upper end and lower end of the selected graphical object.

Herein, the location of the displayed menus 401, 402 may be different from the aforementioned figures depending on settings. For example, a UI window may be placed anywhere on a displayable area of the display 110. In addition, the displayed menus 401, 402 may include at least one menu. In addition, as aforementioned, two displayed menus 401, 402 may be displayed, but it is not limited thereto. Moreover, the menus may be displayed on just one side of the selected graphical object or in any variation of the sides thereof e.g., one the left of and on top of the selected graphical object or on the right of and on the bottom of the selected graphical object, and so on.

FIGS. 5 to 8 are flow diagrams illustrating a method of selecting a displayed menu according to exemplary embodiments.

Figure 5:
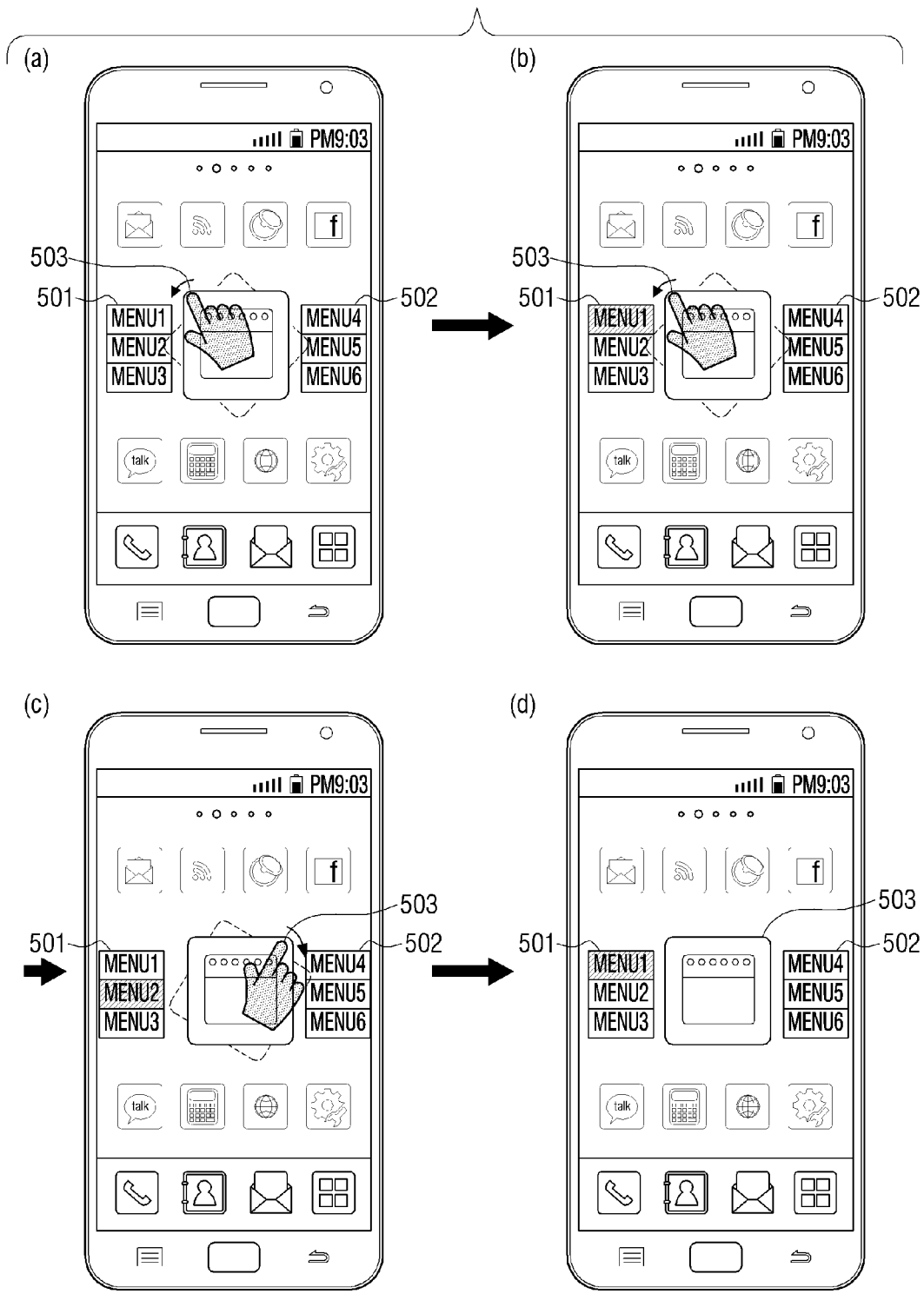
FIGS. 5 to 8 are flow diagrams illustrating selecting a displayed menu according to exemplary embodiments.

As shown in FIG. 5, view (a), in a state where a left and right menus 501, 502, respectively, are displayed, when the user rotates an upper end vertex 503 of a moved and enlarged graphical object in a left direction, menu 1 may be selected in the left menu 501 as shown in FIG. 5, view (b). Herein, when the user rotates the upper end vertex 503 of the graphical object moved and enlarged as shown in FIG. 5, view (b), menu 2 may be selected in the left menu 501 as in FIG. 5, view (c). In this state, when the user rotates the upper end vertex 503 of the moved or enlarged graphical object in a right direction as in FIG. 5, view (c), menu 1 may be selected in the left menu 501 as shown in FIG. 5, view (d).

Figure 6:
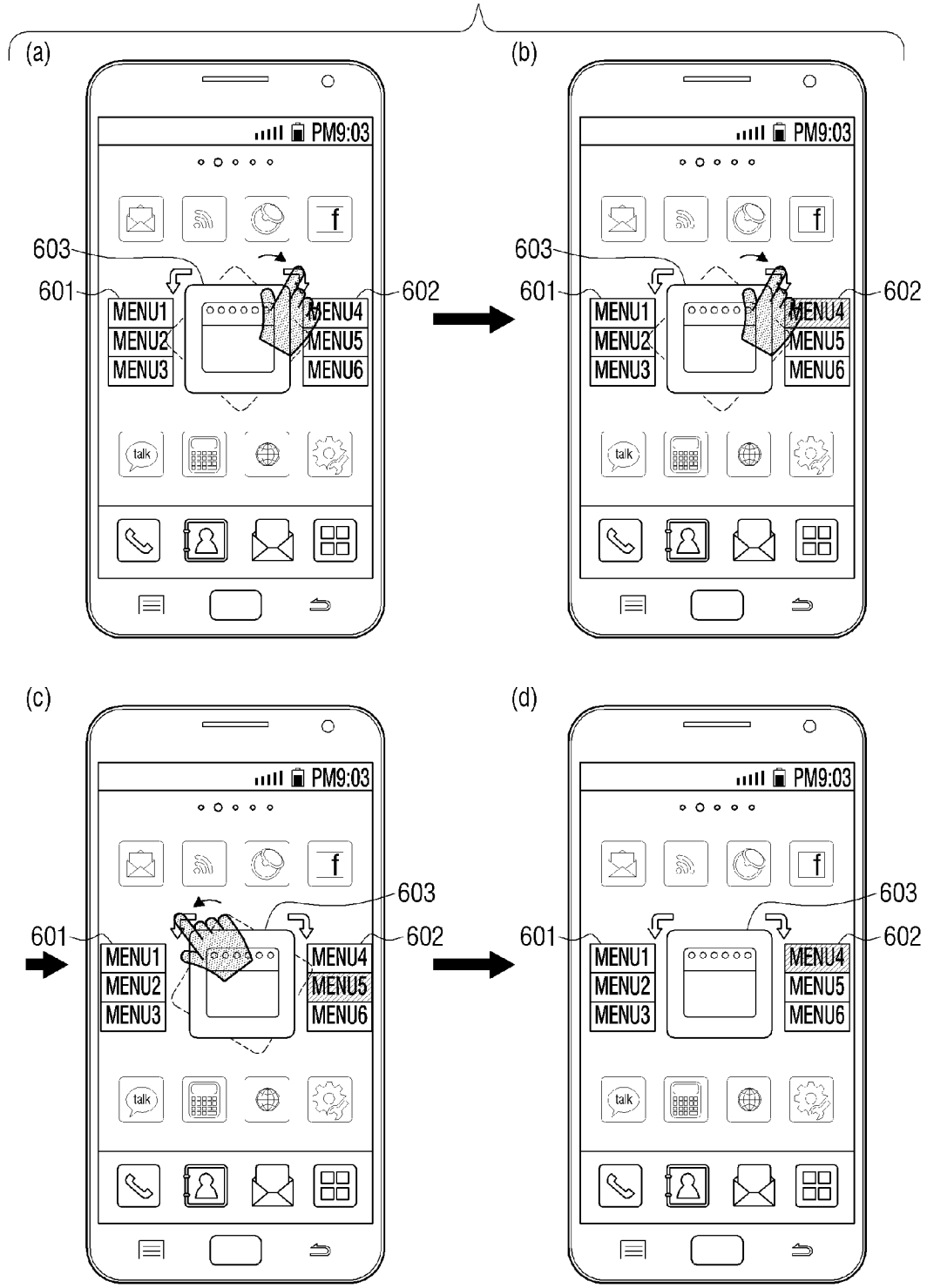

Otherwise, in some of exemplary embodiments, it is possible to select a menu by selecting a rotation GUI which indicates a rotatable direction as in FIG. 6.

That is, as shown in FIG. 6, view (a), in a state where a rotation GUI which indicates a rotatable direction and a left and right menus 601, 602 are displayed, when the rotation GUI which indicates a rotation to a right direction is selected, the moved and enlarged graphical object 603 is rotated to the right direction, enabling selecting menu 4 in the right menu 602 as shown in FIG. 6, view (b). In this state, when the user selects the rotation GUI which indicates a rotation to the right direction as in FIG. 6, view (b), the moved and enlarged graphical object 603 is rotated to the right direction, enabling selecting menu 5 in the right menu 602, as shown in FIG. 6, view (c). In this state, when the user selects the rotation GUI which indicates a rotation to the left direction as shown in FIG. 6, view (c), the moved and enlarged graphical object is rotated to the left direction, enabling selecting menu 4 in the right menu 602 as shown in FIG. 6, view (d).

In addition, in some of exemplary embodiments, a menu displayed in a direction indicated by a rotated upper end vertex in the moved and enlarged graphical object may be selected.

Figure 7:
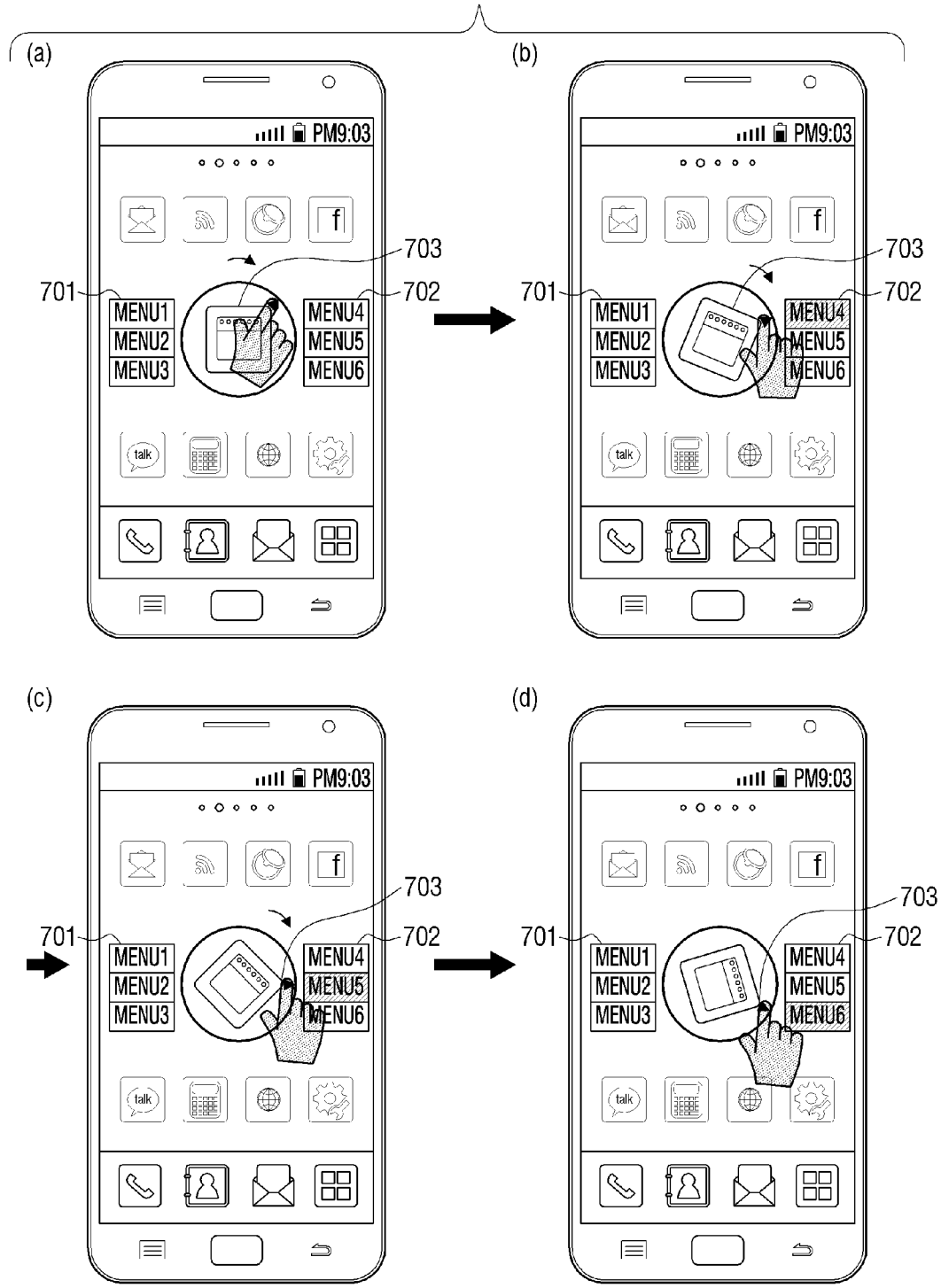

That is, as shown in FIG. 7, view (a), in a state where left and right menus 701, 702 are displayed, when the user rotates the upper end vertex 703 of the moved and enlarged graphical object in the right direction, menu 4 which is displayed in the direction indicated by the right upper end vertex may be selected in the right menu 702 as shown in FIG. 7, view (b). In this state, when the user rotates the upper end vertex 703 of the moved and enlarged graphical object as shown in FIG. 7, view (b) to a further right direction than was rotated and shown in FIG. 7, view (a), menu 5 displayed in a direction indicated by the right upper end vertex may be selected in the right menu 702 as shown in FIG. 7, view (c). In an exemplary embodiment, when the user rotates the upper end vertex of the graphical object moved and enlarged as shown in FIG. 7, view (c) to a further right direction than shown in FIG. 7, view (b), menu 6 displayed in a direction indicated by the right upper end vertex may be selected in the right menu 702 as shown in FIG. 7, view (b).

Figure 8:
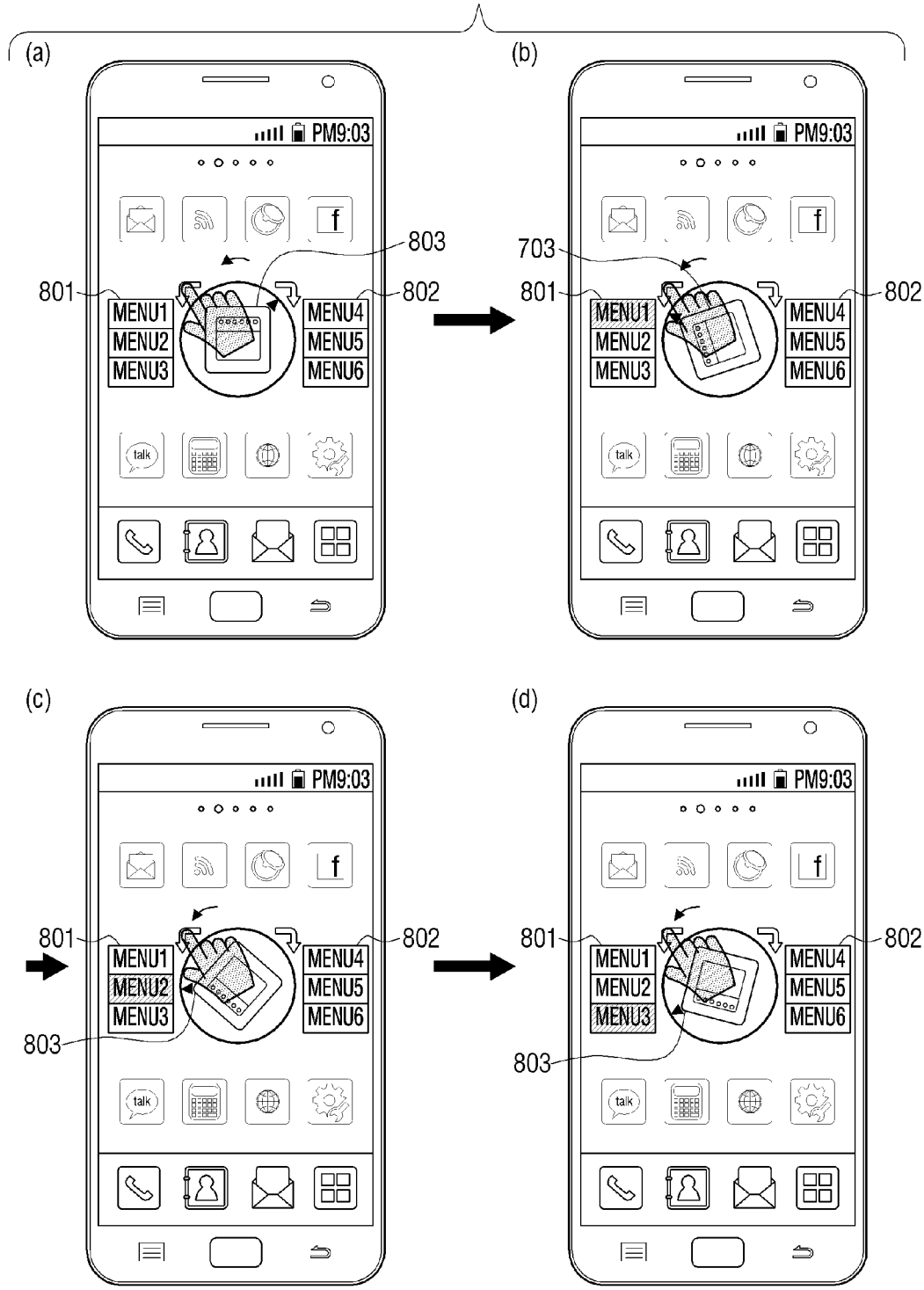

In addition, in some of exemplary embodiments, it is possible to select a menu in a direction indicated by the upper end vertex rotated in the moved and enlarged graphical object by using the rotation GUI which indicates a rotatable direction as shown in FIG. 8.

That is, as shown in FIG. 8, view (a), in a state where the rotation GUI which indicates a rotatable direction, left and right menus 801, 802 are displayed, when the user selects the rotation GUI which indicates a rotation in a left direction, the moved and enlarged graphical object is rotated to the left direction, and menu 1 displayed in the direction indicated by the left upper end vertex 803 of the moved and enlarged graphical object may be selected in the left menu 801 as shown in FIG. 8, view (b). In this state, as shown in FIG. 8, view (b), when the user maintains the state where the rotation GUI which indicates a rotation to the left direction, the moved and enlarged graphical object is further rotated to the left direction than the rotation shown in FIG. 8, view (b), and menu 2 displayed in the direction indicated by the left upper end vertex 803 of the moved and enlarged graphical object may be selected in the left menu 801 as shown in FIG. 8, view (c). In this state, when the user maintains the state where the rotation GUI which indicates a rotation to the left direction is selected as shown in FIG. 8, view (c), the moved and enlarged graphical object is rotated to the left direction further than the rotation shown in FIG. 8, view (c), and menu 3 displayed in the direction indicated by the left upper end vertex 803 of the moved and enlarged graphical object may be selected in the left menu 801 as shown in FIG. 8, view (d).

In an exemplary embodiment, the vertex that the user first selected may be the vertex which becomes the reference for selecting a menu. However, this is provided by way of an example only and not by way of a limitation. In an exemplary embodiment the user may then chose a different vertex to manipulate the menus. Change in the reference vertex will be handled based on settings. For example, the direction of the rotation from a new reference vertex may be used to determine the sub menu to select within the selected menu.

FIG. 9 is a view illustrating controlling of an external device according to whether or not an application installed in the user terminal apparatus is installed in an external device interlocked with the user terminal apparatus according to an exemplary embodiment.

As shown in FIG. 9, view (a), it is possible to receive a command (Apply To TV) 901 for applying an application which corresponds to the graphical object selected in the menu to the external device interlocked with the user terminal apparatus.

In this case, according to the input command, the controller 140 may control the external device. More specifically, in a case where an application corresponding to at least one graphical object selected in the user terminal apparatus is installed in the external device, the controller 140 may generate a control signal for executing the application where the external device is installed. In addition, in a case where the application corresponding to at least one graphical object selected in the user terminal apparatus is not installed in the external device, the controller 140 may generate a control signal to automatically install the application. The control signal generated herein may be transmitted to the external device through the communication interface 130. In this case, the external device may execute the application pre-installed according to the delivered control signal as in FIG. 9, view (b), or automatically install the application 902.

In an exemplary embodiment, the user terminal apparatus 100 for automatically installing the application may generate a control signal which includes an APK (Application Package) file regarding the application. In addition, the generated control signal may be transmitted through the communication interface 130.

In this case, the external device may automatically install the application using the APK (Application Package) file included in the control signal. However, if the received APK file is a file that cannot be applied to the external device due to problems such as resolution, the external device may automatically download an application which is applicable to the external device from among the applications corresponding to the APK file received from the application server and install the application.

In addition, in order to automatically install the application, the user terminal apparatus 100 may generate a control signal which includes information about the application for installation. In addition, the generated control signal may be transmitted through the communication interface 130. Herein, information about the application may be information about what type of application would be acceptable and/or compatible with the external device. That is, information about the application may include identifying types of applications that would be executable by the external device.

In an exemplary embodiment, the external device may automatically download the application identified or obtained by analyzing the information about the application received from the application server and install the application.

In addition, in a case where the application is executed in the external device by the aforementioned operation, the controller 140 may control the operations of the user terminal apparatus 100. For example, in a case where a video application is executed in the external device and video is replayed, the controller 140 may control the display 130 to display a remote control UI for maneuvering replaying of the video. In addition, in a case where a game application is executed in the external device and the game is executed, the controller 140 may control the display 130 to display a UI for controlling the game.

Figure 10:
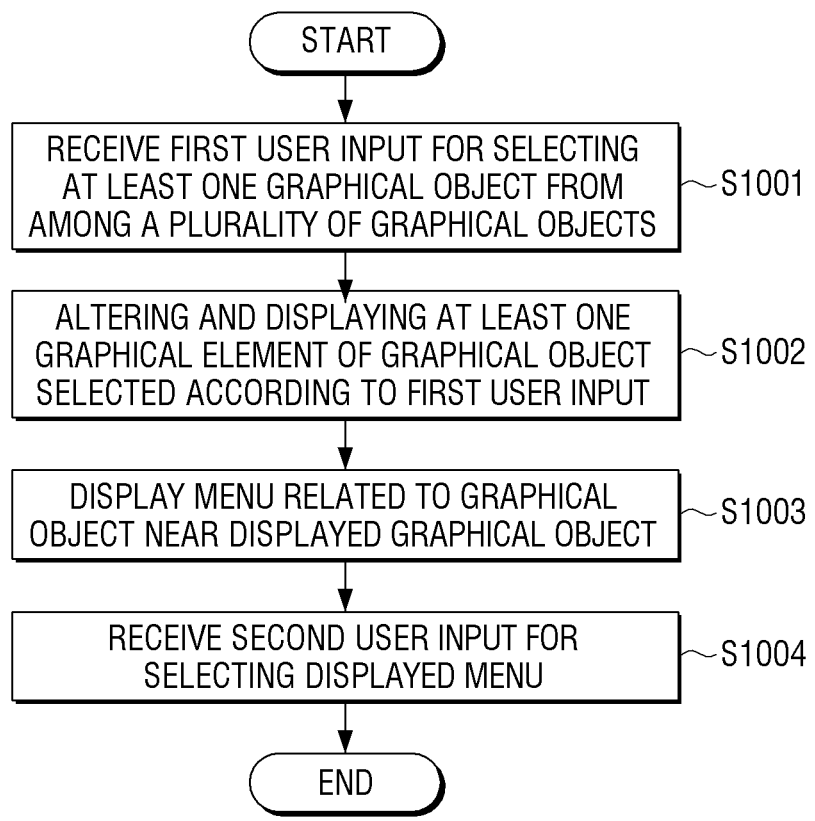
FIG. 10 is a flowchart illustrating a method of controlling a user terminal apparatus according to an exemplary embodiment.

FIG. 10 is a flowchart illustrating a method of controlling a user terminal apparatus according to an exemplary embodiment. With reference to FIG. 10, a first user input for selecting at least one graphical object from among a plurality of graphic objects is received (in operation S1001).

Next, at least one graphical element of the graphical object selected according to the first user input is altered and displayed (in operation S1002). Herein, the altering of the graphical element may be altering at least one of a size, a location, and a color of the graphical object.

In addition, a menu related to the graphical object is displayed near the displayed graphical object (in operation S1003). The menu related to the selected graphical object may include at least one of a function menu regarding a particular function provided by the selected graphical object, and a setting menu for setting an option for the selected graphical object.

Furthermore, a second user input for selecting the displayed menu is received (in operation S1004).

Herein, the second user input is a rotation input which rotates the selected graphical object in a first or second direction, in which case, the displayed menu may be selected according to the rotation input. In addition, the displayed menu may be selected according to the direction indicated by the upper end or lower end vertex of the selected rotating graphical object, according to the rotation input.

Furthermore, the second user input may be a touch input which touches the displayed menu. In this case, the displayed menu may be selected according to the touch pressure.

Meanwhile, the aforementioned method for controlling the user terminal apparatus may further include displaying a GUI which indicates a rotatable direction near the selected graphical object, when a graphical object is selected according to the first user input.

If the second user input is a touch input regarding the GUI corresponding to the rotation direction of the displayed graphical object, the displayed menu may be selected according to the touch input.

In addition, the aforementioned method for controlling the user terminal apparatus may further include setting the altered and displayed graphical object in a rotatable state.

In addition, the aforementioned method for controlling the user terminal apparatus may further include receiving a third user input for returning back to a state before at least one graphical object was selected from among the plurality of graphical objects.

Furthermore, the aforementioned method for controlling the user terminal apparatus may further include providing feedback which notifies that the menu to be selected has been altered according to the rotation of the selected graphical object.

In addition, the aforementioned method for controlling the user terminal apparatus may further include a menu for applying the application corresponding to the selected graphical object to the external device interlocked with the user terminal apparatus being selected according to the second user input, and controlling the external device to automatically install the application when the application corresponding to the selected graphical object is not installed, and controlling the external device to automatically execute the application when the application corresponding to the selected graphical object is pre-installed.

Figure 11:
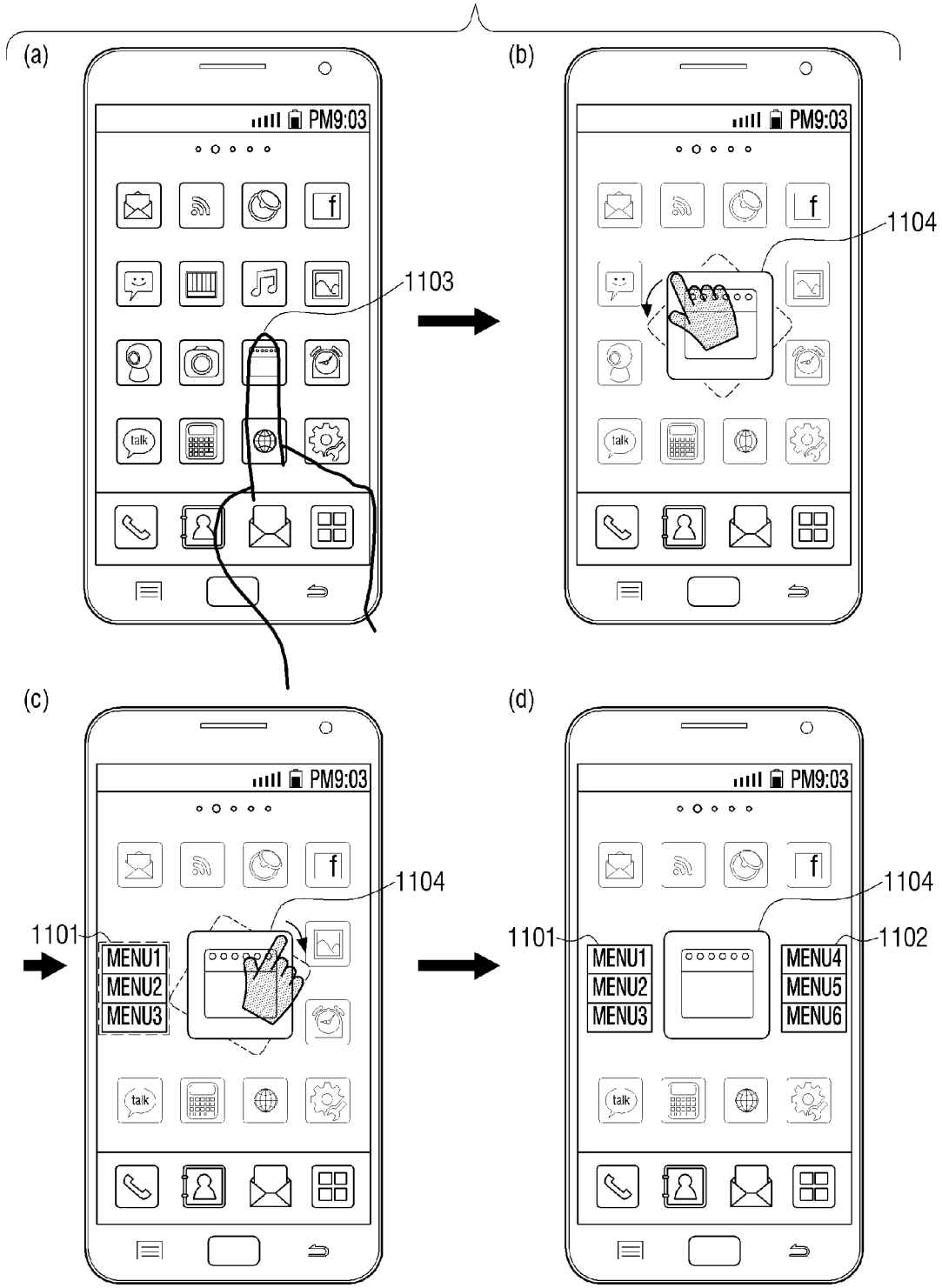
FIGS. 11 to 13 are flow diagrams illustrating a method of controlling a user terminal apparatus according to another exemplary embodiment.
Figure 12:
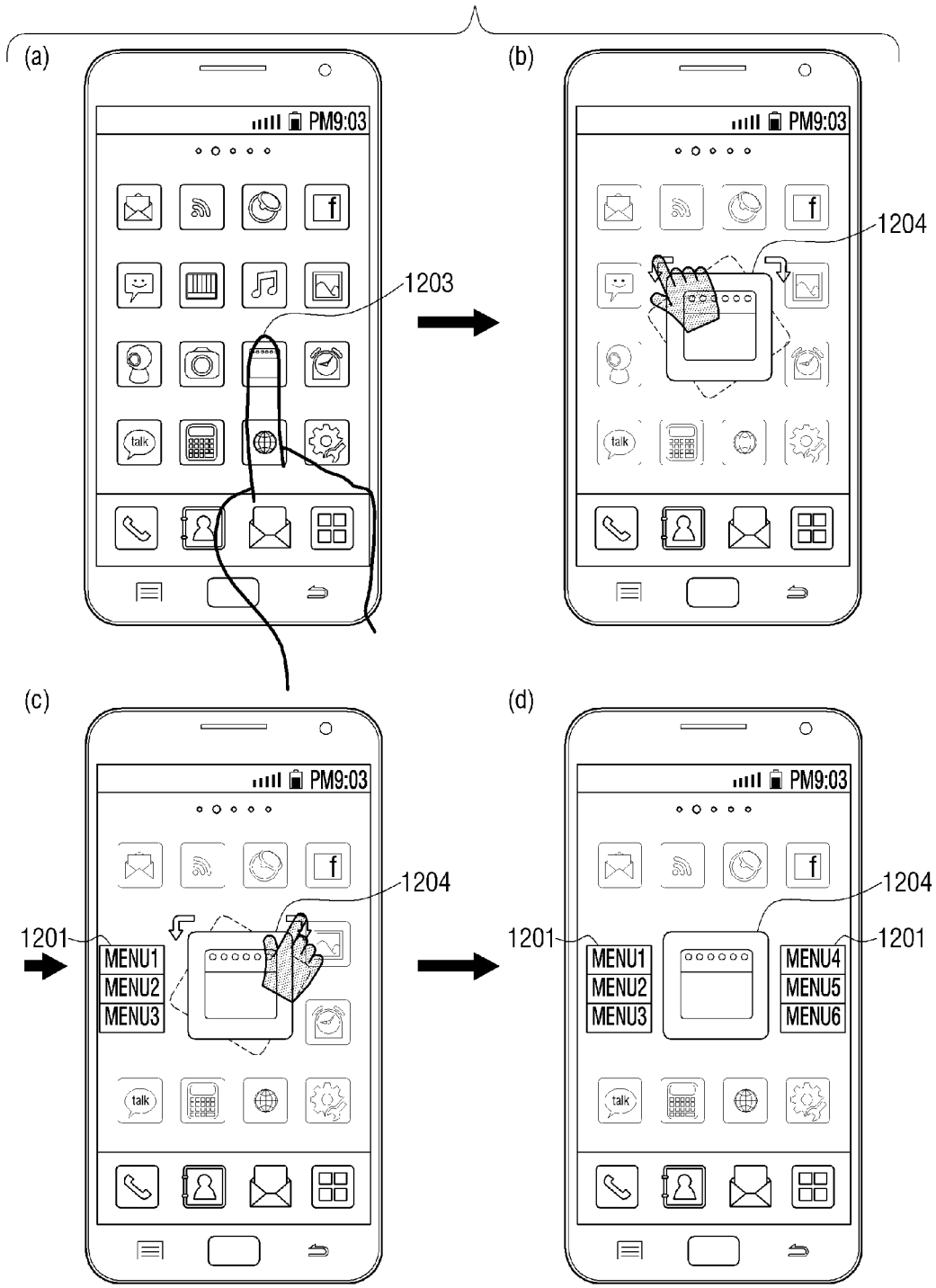
Figure 13:
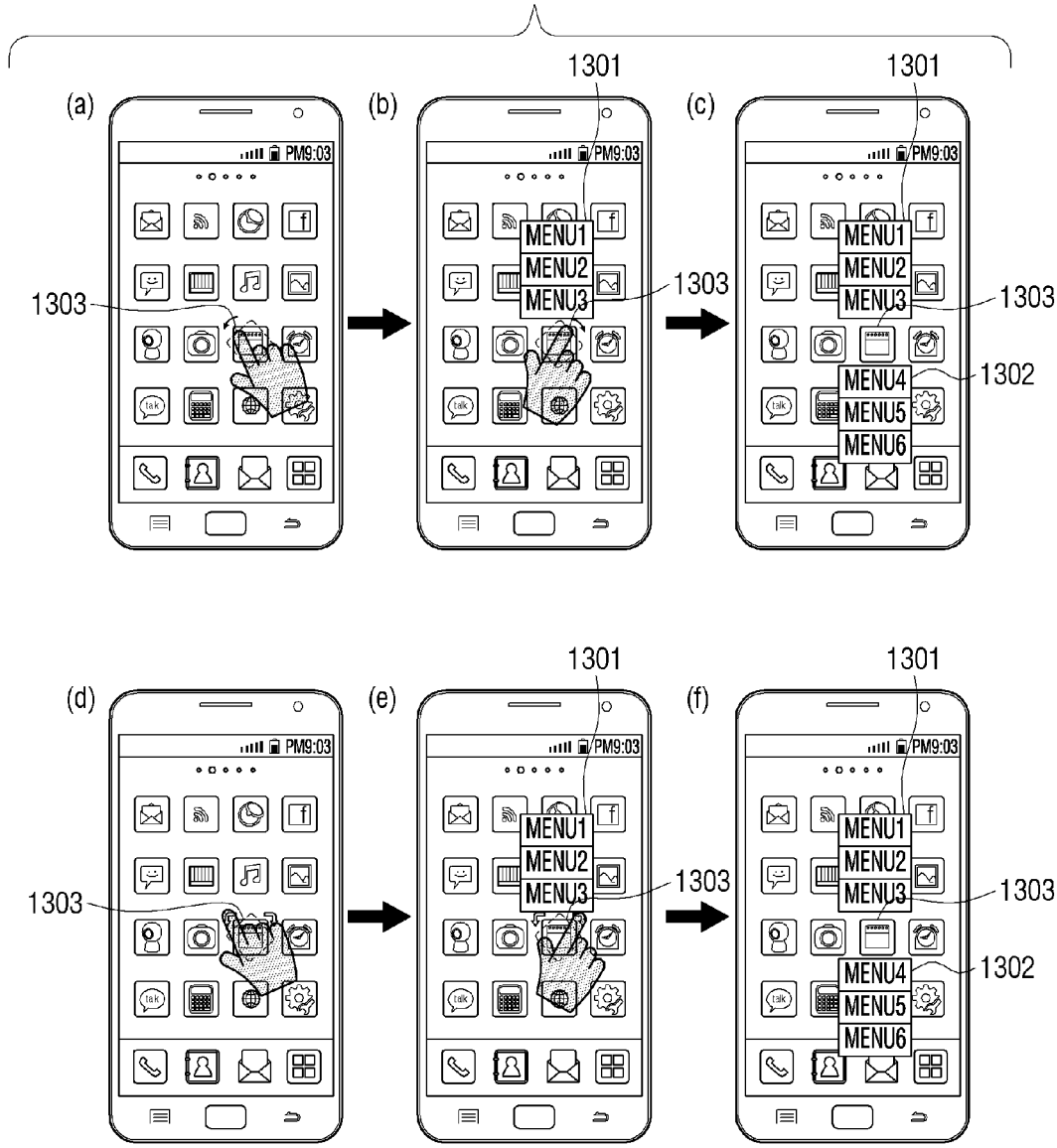

FIGS. 11 to 13 are flow diagrams illustrating a method of controlling the user terminal apparatus according to another exemplary embodiment.

As shown in FIG. 11, view (a), when at least one graphical object 1103 is selected based on a first user input in a state where a plurality of graphical objects are displayed, the graphical object 1104 selected as shown in FIG. 11, view (b) may be moved and enlarged to be in a rotatable state. In this case, when the user rotates the selected graphical object 1104 to the left direction, menu 1, 2, 3, . . . 1101 may be displayed in the left direction of the selected graphical object as shown in FIG. 11, view (c). In addition, in this state, when the user rotates the selected graphical object to the right direction, menu 4, 5, 6, . . . 1102 may be displayed in the right direction of the selected graphical object 1104 as shown in FIG. 11, view (d).

Furthermore, in some of exemplary embodiments, it is possible to rotate the selected application graphical object by selecting the rotation GUI which indicates the rotatable direction as shown in FIG. 12. That is, as shown in FIG. 12, view (a), when at least one graphical object is selected in a state where a plurality of graphical objects are displayed, the selected graphical object 1204 may move to the center and be enlarged to be in a rotatable state as shown in FIG. 12, view (b). In this case, near the graphical object which has been made rotatable, the rotation GUI which indicates the rotatable direction may be displayed. Accordingly, when the user selects the rotation GUI which indicates the rotation in the left direction as shown in FIG. 12, view (b), a first menu 1201 may be displayed in the left direction of the selected graphical object as shown in FIG. 12, view (c). In addition, when the user selects the rotation GUI which indicates the rotation in the right direction as shown in FIG. 12, view (c), a second menu 1202 may be displayed in the right direction of the selected graphical object, as shown in FIG. 12, view (d).

Furthermore, in some of exemplary embodiments, a menu may be displayed by rotating the selected graphical object without moving or enlarging the selected application graphical object as shown in FIG. 13. That is, as shown in FIG. 13, view (a), when at least one graphical object 1303 is selected and is rotated to the left direction in a state where a plurality of graphical objects are displayed, a first menu 1301 may be displayed on the upper end of the selected graphical object 1303 as shown in FIG. 13, view (b). In addition, in this state, when the user rotates the selected graphical object to the right direction, a second menu 1302 may be displayed on the lower end of the selected graphical object as shown in FIG. 13, view (c).

Furthermore, in some exemplary embodiments, when at least one graphical object is selected in a state where a plurality of graphical objects are displayed, the rotation GUI which indicates the rotatable direction may be displayed near the at least one selected graphical object as shown in FIG. 13, view (d). In this case, when the rotation GUI which indicates a rotation in the left direction is selected, the first menu 1301 may be displayed on the upper end of the selected graphical object as shown in FIG. 13, view (e). Furthermore, in this state, when the rotation GUI which indicates a rotation in the right direction is selected as shown in FIG. 13, view (e), the second menu 1302 may be displayed on the lower end of the selected graphical object as shown in FIG. 13, view (f).

Meanwhile, when a menu is displayed as illustrated by way of an example in FIGS. 11 to 13, the displayed menu may be selected by the received second user input. An example of which was explained above and thus detailed explanation shall be omitted.

Meanwhile, the method for controlling the user terminal apparatus according to various exemplary embodiments may be embodied as a program code and be provided to each server or device in a state stored in various non-transitory computer readable media.

The non-transitory computer readable medium refers to a computer readable medium which stores data semi-permanently and not for a short period such as a resistor, a cache, or a memory etc. More specifically, the various applications and programs may be stored in a non-transitory computer readable medium such as a CD, DVD, hard disk, blue ray disk, USB, memory card, and ROM etc., and be provided.

Although a few exemplary embodiments have been shown and described, it would be appreciated by those skilled in the art that changes may be made in exemplary embodiments without departing from the principles and spirit of the invention, the scope of which is defined in the claims and their equivalents. It is understood that all possible changes and/or modifications in form and details may be made therein without departing from the spirit and scope of an inventive concept as defined by the appended claims and their equivalents. The scope is defined not by the detailed description of exemplary embodiments but by the appended claims, and their equivalents and all differences within the scope will be construed as being included in an inventive concept.

What is claimed is:

1. A method of controlling a user terminal apparatus comprising:
   receiving a first user input for selecting at least one graphical object from among a plurality of graphical objects displayed on a touch display screen of the user terminal apparatus, through the touch display screen;
   altering and displaying at least one graphical element which configures the selected graphical object selected according to the first user input;
   displaying a menu related to the selected graphical object; and
   receiving a second user input for selecting an item on the displayed menu, through the touch display screen,
   wherein the second user input is a manipulation of the selected graphical object, and
   wherein the manipulation of the selected graphical object comprises changing a position of the selected graphical object to select the item.

2. The control method according to claim 1, wherein the menu related to the selected graphical object comprises at least one of a function menu regarding a particular function provided by the selected graphical object, and a setting menu for setting an option for the selected graphical object.

3. The control method according to claim 1, wherein the altering and displaying the at least one graphical element of the graphical object comprises altering and displaying at least one of a size of the graphical object, a location of the graphical object, and a color of the graphical object.

4. The control method according to claim 1, further comprising displaying a Graphical User Interface (GUI) which indicates a rotatable direction near the selected graphical object, when the graphical object is selected.

5. The control method according to claim 4, wherein the second user input is a touch input of the GUI corresponding to a rotation direction of the displayed graphical object, and
   wherein the item on the displayed menu is selected according to the touch input.

6. The control method according to claim 1, further comprising setting the altered and displayed graphical object in a rotatable state.

7. The control method according to claim 1, wherein the second user input is a rotation input for rotating the displayed graphical object in a first direction or a second direction, and
   wherein an item on the displayed menu is selected based on the rotation input.

8. The control method according to claim 7, wherein the item on the displayed menu is selected according to a direction indicated by a top end vertex or a low end vertex of the displayed graphical object rotated based on the rotation input.

9. The control method according to claim 7, further comprising providing feedback which notifies that the selected item has been altered according to a rotation of the displayed graphical object.

10. The control method according to claim 1, further comprising receiving a third user input for returning back to a state before the at least one graphical object was selected from among a plurality of graphical objects.

11. The control method according to claim 1, further comprising:
    selecting an item on the displayed menu for an application corresponding to a displayed graphical object, where the application is executable by an external device which is interlocked with the user terminal apparatus according to the second user input; and
    if the application is pre-installed in the external device, executing the pre-installed application, if the application is not pre-installed in the external device, controlling the external device to automatically install the application.

12. The control method according to claim 1, wherein the menu related to the selected graphical object is displayed as adjacent to the selected graphical object or abutting the selected graphical object.

13. The control method according to claim 1, wherein the menu related to the selected graphical object comprises at least two menus, each of which is displayed adjacent to the selected graphical object at different locations.

14. The method according to claim 1, wherein the menu related to the selected graphical object comprises a function menu regarding a particular function provided by the selected graphical object and a setting menu for setting an option for the selected graphical object.

15. The method according to claim 14, wherein the second user input comprises a rotation of the selected graphical object to select at least one item on one of the function menu and the setting menu.

16. A user terminal apparatus comprising:
a touch display screen which receives a first user input or a second user input and displays a plurality of graphical objects; and
a controller which alters and displays at least one graphical element configuring a graphical object selected based on the first user input and controls the touch display screen to display a menu related to the selected graphical object, and controls to select an item on the displayed menu based on the second user input, wherein the second user input is a manipulation of the selected graphical object and wherein the manipulation of the selected graphical object comprises changing a position of the selected graphical object to select the item.

17. The user terminal apparatus according to claim 16, wherein the menu related to the selected graphical object comprises at least one of a function menu regarding a particular function provided by the selected graphical object, and a setting menu for setting an option for the selected graphical object.

18. The user terminal apparatus according to claim 16, wherein the control unit alters and displays at least one of a size of the graphical object, a location of the graphical object, and a color of the graphic object.

19. The user terminal apparatus according to claim 16, wherein the controller is configured to control the display screen to display a Graphical User Interface (GUI) which indicates a rotatable direction near the selected graphical object, when the graphic object is selected.

20. The user terminal apparatus according to claim 19, wherein the item on the displayed menu is selected according to a touch input, if the user input comprises a touch input of an arrow GUI corresponding to a rotation direction of the displayed graphical object.

21. The user terminal apparatus according to claim 16, wherein the controller sets the altered and displayed graphical object in a rotatable state.

22. The user terminal apparatus according to claim 16, wherein the second user input is a rotation input for rotating the displayed graphical object in a first direction or a second direction, and
wherein the item on the displayed menu is selected based on the rotation input.

23. The user terminal apparatus according to claim 22, wherein the item on the displayed menu is selected according to a direction indicated by a top end or low end vertex of the displayed graphical object rotated based on the rotation input.

24. The user terminal apparatus according to claim 22, wherein the controller provides feedback which notifies that the selected item has been altered according to a rotation of the selected graphical object.

25. The user terminal apparatus according to claim 16, wherein the controller controls the display screen to return back to a state before the at least one graphical object was selected from among a plurality of graphical objects, if a third user input is received using the display screen, which is a touch display screen.

26. The user terminal apparatus according to claim 16, further comprising a communication interface which connects the user terminal apparatus with an external device,
wherein, if an item on the displayed menu for an application corresponding to a displayed graphical object, wherein the application is executable by the external device which is interlocked with the user terminal apparatus, is selected according to the user input and if the application is pre-installed in the external device, the controller executes the pre-installed application, and
wherein if the item on the displayed menu for the application corresponding to the displayed graphical object, wherein the application is executable by the external device which is interlocked with the user terminal apparatus, is selected according to the user input and if the application is not pre-installed in the external device, the controller sends a control signal for automatically installing the application using the communication interface.

27. A non-transitory computer readable recording medium where a program code for executing a method of controlling a user terminal apparatus is recorded thereon, the control method comprising:
receiving a first user input for selecting at least one graphical object from among a plurality of graphical objects displayed on a touch display screen of the user terminal apparatus, through the touch display screen;
altering and displaying at least one graphical element which configures the selected graphical object selected according to the first user input;
displaying a menu related to the selected graphic object; and
receiving a second user input for selecting an item on the displayed menu, through the touch display screen,
wherein the second user input is a manipulation of the selected graphical object, and
wherein the manipulation of the selected graphical object comprises changing a position of the selected graphical object to select the item.

28. A method of controlling a user terminal apparatus comprising:
receiving a first user input for selecting at least one graphical object from among a plurality of graphical objects;
displaying at least two menus related to the selected graphical object; and
receiving a second user input using a rotatable Graphical User Interface (GUI) for selecting one of the displayed two menus,
wherein the first menu comprises functional items of the selected graphical object and a second menu comprises setting items of the selected graphical object,
wherein the second user input is a rotation motion by a hand of a user with respect to the displayed selected graphical object, and
wherein the first menu and the second menu are symmetrically displayed with respect to each other and with the selected graphical object therein between such that rotation of the selected graphical object in a first direction results in a selection of the first menu and rotation of the selected graphical object in a second direction results in a selection of the second menu.

29. The method according to claim 28, wherein the second user input comprises directional input by manipulating the rotatable GUI.

30. The method according to claim 28, wherein the first menu is display directly above the selected graphical object and the second menu is displayed directly below the selected graphical object or the first menu is displayed directly left of the selected graphical object and the second menu is displayed directly right of the selected graphical object and wherein the graphical objects are icons representing functions of the user terminal apparatus.

\* \* \* \* \*